(12) United States Patent
Kingston et al.

(10) Patent No.: US 6,347,518 B1
(45) Date of Patent: Feb. 19, 2002

(54) PEDAL SIMULATOR USING SPRING WITH NON-LINEAR RESPONSE

(75) Inventors: Andrew W. Kingston, Heidesheim; Salvatore Oliveri, Filsen; Robert L. Ferger, Hamburg; Thomas Weigert, Bad Soden, all of (DE); Peter Every, Westland, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/370,527

(22) Filed: Aug. 6, 1999

Related U.S. Application Data

(63) Continuation of application No. PCT/US98/02613, filed on Feb. 6, 1998.
(60) Provisional application No. 60/037,430, filed on Feb. 7, 1997.

(51) Int. Cl.⁷ .............................. B60T 13/20; F16J 1/10
(52) U.S. Cl. ............................................. 60/552; 92/84
(58) Field of Search ........................ 60/533, 552; 92/84

(56) References Cited

U.S. PATENT DOCUMENTS

| | | | | |
|---|---|---|---|---|
| 2,255,359 A | * | 9/1941 | Lepersonne | 60/563 |
| 4,126,996 A | | 11/1978 | Leiber | |
| 4,162,616 A | * | 7/1979 | Hayashida | 60/533 |
| 4,463,561 A | * | 8/1984 | Leiber | 61/552 X |
| 5,428,960 A | | 7/1995 | Hanaoka | |
| 5,544,948 A | | 8/1996 | Schmidt et al. | |
| 5,735,188 A | | 4/1998 | Nix et al. | |

FOREIGN PATENT DOCUMENTS

| | | | | |
|---|---|---|---|---|
| DE | 468648 | * | 11/1928 | .................... 92/84 |
| DE | 43 43 386 A | | 6/1995 | |
| DE | 195 02 925 A1 | | 8/1996 | |
| DE | 195 46 647 A | | 6/1997 | |
| FR | 1235160 | * | 5/1960 | .................. 60/533 |
| GB | 288080 | * | 4/1928 | .................... 92/84 |
| GB | 540145 | * | 10/1941 | .................. 60/533 |
| IT | 477772 A | | 2/1953 | |
| JP | 55-31681 A | | 3/1980 | |
| JP | 02 081762 A | | 3/1990 | |
| WO | WO 94/01311 | * | 1/1994 | .................. 60/533 |

\* cited by examiner

Primary Examiner—John E. Ryznic
(74) Attorney, Agent, or Firm—MacMillan, Sobanski & Todd, LLC

(57) ABSTRACT

A pedal simulator utilizing springs to provide a brake pedal with a non-linear, progressively increasing response characteristic for pedal travel versus force exerted on the brake pedal similar to a conventional hydraulic braking system. In a preferred embodiment, the pedal simulator is integrated into the housing of an associated master cylinder. The non-linear, progressively increasing response characteristic is provided in one embodiment by a conical spring having a non-uniform helix angle. In second and third embodiments, the non-linear, progressively increasing response characteristic is provided by a plurality of cylindrical coil springs.

9 Claims, 10 Drawing Sheets

| Simulator Input Force (lb) Vs Simular stroke (in.) based on a 2.84:1 pedal ratio. | | | | | | | |
|---|---|---|---|---|---|---|---|
| Simulator Input Force (lb) | 0.0 | 0.14 | 0.42 | 0.55 | 0.61 | 0.62 | 0.69 | 0.83 |
| Simulator stroke (in) | 10.9 | 10.9 | 37.0 | 63.8 | 89.3 | 94.0 | 127.7 | 255.4 |
| Simulator force (lb) | | 0.0 | 93.3 | 193.4 | | | 460.6 | 690.9 |
| slope rqd. Lb/in | | | | | | | | |

FIG.7A

Nested Spring
Pedal Simulator

| Spring Dimension | SPRING #1 | SPRING #2 | SPRING #3 |
|---|---|---|---|
| Rate (R) lb/in. | 72.00 | 156.0 | 552.0 |
| Load (P) lb. | 69.00 | 64.00 | 121.4 |
| Mean coil Dia. (D) | 1.375 | 1.000 | 0.625 |
| Wire dia. (d) | 0.141 | 0.127 | 0.141 |
| Active coils (Na) | 2.800 | 2.400 | 4.200 |
| Wahl factor (K) | 1.200 | 1.200 | 1.400 |
| O/Dia. | 1.516 | 1.127 | 0.766 |
| I/dia. | 1.234 | 0.873 | 0.484 |
| R1 | 200.0 | 370.0 | 2300 |
| Height Closed Hc | 0.674 | 0.559 | 0.870 |
| Free Height Hf | 1.634 | 0.969 | 1.200 |
| D/d | 9.800 | 7.900 | |

FIG.7B

Use 3 springs loaded in parellel to approximate required load and stroke.

| Input stroke | Spring #1 | | Spring #2 | | Spring #3 | |
|---|---|---|---|---|---|---|
| Position | Def. | Load | Def. | Load | Def. | Load |
| 0.00 | 0.13 | 9.4 | 0.00 | 0.0 | 0.00 | 0.0 |
| 0.42 | 0.55 | 39.6 | 0.00 | 0.0 | 0.00 | 0.0 |
| 0.61 | 0.74 | 53.2 | 0.19 | 30.0 | 0.00 | 0.0 |
| 0.83 | 0.96 | 69.0 | 0.41 | 64.0 | 0.22 | 121.4 |

| SIMULATOR STROKE in. | 0.00 | 0.14 | 0.28 | 0.42 | 0.55 | 0.61 | 0.62 | 0.69 | 0.83 |
|---|---|---|---|---|---|---|---|---|---|
| FORCE #1 SPRING | 9.40 | 19.50 | 29.60 | 39.60 | 49.00 | 53.20 | 54.00 | 59.10 | 69.00 |
| FORCE #2 SPRING | | | | | 20.30 | 30.00 | 31.20 | 42.10 | 64.00 |
| FORCE #3 SPRING | | | | | | 0.00 | 5.50 | 44.20 | 121.4 |
| FORCE TOTAL | 9.40 | 19.50 | 29.60 | 40.00 | 69.30 | 83.80 | 90.80 | 145.4 | 255.2 |
| FORCE REQUIRED | 9.40 | 10.90 | 25.50 | 37.00 | 63.80 | 89.30 | 94.00 | 127.7 | 255.4 |

PEDAL SIMULATOR USING SPRING WITH NON-LINEAR RESPONSE

CROSS-REFERENCE TO RELATED APPLICATIONS

This application is a continuation of copending International Application PCT/US98/002613 filed Feb. 6, 1998, and which designated the U.S., and claims the benefit of U.S. Provisional Application No. 60/037,430 filed Feb. 7, 1997.

BACKGROUND OF THE INVENTION

The invention relates to vehicle braking systems, and in particular to pedal simulator, also known as a compliance unit, for use in advanced braking systems where actulation of a brake pedal does not directly actuate hydraulic brakes, but rather acts to generate a braking demand signal which is used as an input to an electronically controlled vehicle braking system. Such advanced braking systems, are sometimes termed brake-by-wire braking systems or electro-hydraulic braking systems. In such systems, during normal braking operations, it is known to use a sensor to measure the displacement of the brake pedal, with the sensor generating a signal indicative of the distance the brake pedal is moved by the driver of the vehicle. This displacement signal is sent to an electronic control unit as a driver braking demand signal. It also known, during normal braking operations, to measure the force with which the driver depresses the brake pedal as another indication of the driver's braking demand. This force may be measured directly by force sensors. However, the brake pedal typically is connected to actuate a piston, as in a master cylinder of a hydraulic braking system. A measurement of the pressure generated by the movement of the piston in a fluid system can be correlated to the force exerted by the driver on the brake pedal actuating the piston. Thus, a pressure sensor may be provided to sense the pressure generated in a master cylinder actuated by the brake pedal, with the signal produced by the pressure sensor being sent to the electronic control unit as another indication of the driver's braking demand.

In advanced braking systems of this type, the master cylinder is normally isolated from the vehicle's brakes during braking. Instead, the electronic control unit, responding to the braking demand signals, controls the operation of various pumps and valves to apply pressurized fluid to the vehicle brakes to achieve the desired braking action. Typically, in event of a malfunction, the valves would be repositioned to admit pressurized fluid from the master cylinder to the vehicle brakes.

It is desirable to provide a braking system which has a "pedal feel" which is similar to what drivers are used to in conventional hydraulic vehicle braking systems. That is, when the driver steps on the brake pedal with a certain speed and force, the driver expects to feel the brake pedal to respond with a characteristic resistance and movement to which the driver has become accustomed in operating conventional hydraulic vehicle braking systems. If the brake pedal of an advanced vehicle braking system is attached to actuate a master cylinder, the fluid in the master cylinder must be provided with a path to leave the master cylinder in order for the brake pedal to move (as expected) when the driver steps on the brake pedal, Typically, the fluid in the master cylinder is diverted to a pedal simulator, that is, an accumulator which receives pressurized fluid from the pedal simulator to permit the pedal to move as expected when the driver steps on the brake pedal.

The pedal travel is simulated to be that of a conventional hydraulic brake system. Typically, the pedal simulator is formed as a hydraulic cylinder with a movable piston therein acting against a coiled metal compression spring. The pressurized fluid from the master cylinder enters the pedal simulator, pushing the piston against the spring, which exerts a resisting force according to the spring characteristic of the spring. A conventional coil spring has a relatively linear spring characteristic of compression versus force exerted on the spring. This linear characteristic is reflected in a relatively linear response characteristic for pedal travel versus force exerted on a brake pedal in a brake system in which such a conventional coil spring is used.

SUMMARY OF THE INVENTION

This invention relates to a pedal simulator utilizing springs to provide a rake pedal with a non-linear, progressively increasing response characteristic for pedal travel versus force exerted on the brake pedal similar to a conventional hydraulic braking system. In a preferred embodiment, the pedal simulator is integrated into the housing of an associated master cylinder. The non-linear, progressively increasing response characteristic is provided in one embodiment by a conical spring having a non-uniform helix angle. In second and third embodiments, the non-linear, progressively increasing response characteristic is provided by a plurality of cylindrical coil springs.

Various objects and advantages of this invention will become apparent to those skilled in the art from the following detailed description of the preferred embodiment, when read in light of the accompanying drawings.

BRIEF DESCRIPTION OF THE DRAWINGS

FIG. 7A is a chart of spring characteristics for one suitable set of springs which may be used in the pedal simulator of FIG. 4.

FIG. 7B is a chart of predicted pedal simulator stroke versus individual spring deflection and loading for the springs in the chart of FIG. 7A.

DESCRIPTION OF THE INVENTION

Preliminarily it should be noted that the values of various units of measure used in this application are for illustration only, and are not intended as limitations on the scope of the invention.

Figure 1:
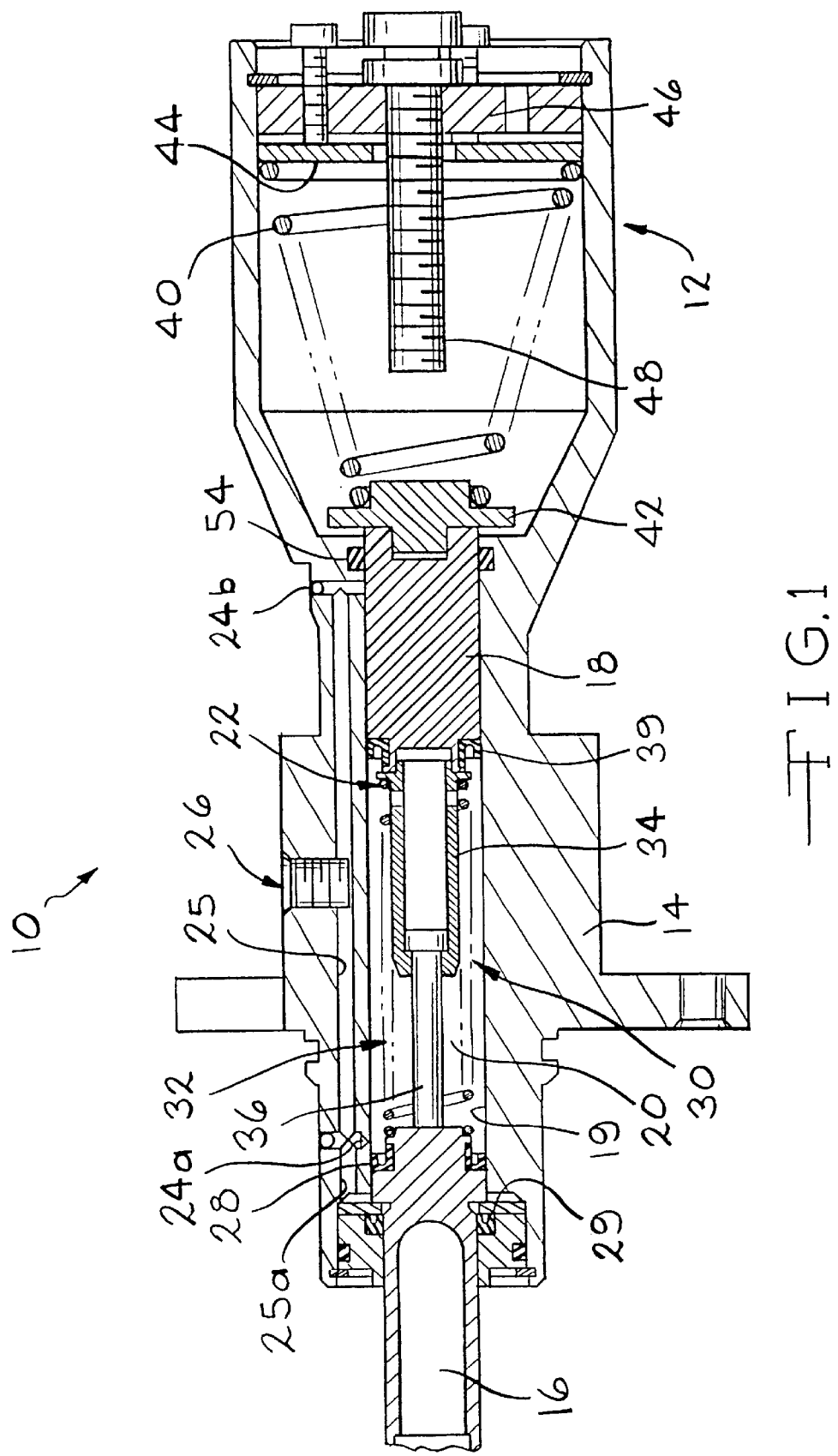
FIG. 1 is a sectional view of a master cylinder with an integrated pedal simulator having a conical spring according to a first embodiment of the invention.

There is shown in FIG. 1 a first embodiment of a master cylinder 10 which includes an integrated pedal simulator 12 in accordance with the present invention. The master cylinder 10 is installed in a brake system (not shown) in which the wheel brakes are controlled by electronics, but are operated by hydraulic fluid means. The master cylinder 10 can be effective to apply brakes at all four wheels, the front wheels, the rear wheels, or any combination of individual wheels. It should be understood that a dual circuit (tandem) or other type of master cylinder can also be provided.

The master cylinder 10 includes a housing 14 and two pistons: a pressure piston 16 and a floating piston 18 which are slidably disposed within a bore 19 formed through the housing 14. The pressure piston 16 is operatively connected to a brake pedal (not shown), similar to that of conventional master cylinder brake assemblies. A hydraulic chamber 20 is defined by the bore 19, the pressure piston 16, and the floating piston 18. An outlet port 22 formed through the housing 14 to provide communication between the hydraulic chamber 20 and a vehicle hydraulic brake system (not shown). Under normal operating conditions the hydraulically actuated, electronically controlled brake system operates wheel brake(s) (not shown) in response to an electrical brake demand signal. The master cylinder 10 is isolated from the wheel brakes by one or more isolation valves not shown. Such a brake arrangement may be broadly referred to as a brake-by-wire system.

The master cylinder 10 includes a first compensation hole 24a which is in fluid communication with a reservoir (not shown) via a conduit 25 and a reservoir port 26. A lip seal 28 is circumferentially mounted about the cylindrical wall of the pressure piston 16 engaging the wall of the bore 19, thereby sealing the chamber 20. A lip seal 29 is fixed with respect to the housing 14 and engages the outer wall of the pressure piston 16 and provides a seal between the pressure piston 16 and the end of the master cylinder 10. The conduit 25 has an extension 25a in fluid communication with the bore 19 between the lip seal 29 and the lip seal 28. A second compensation hole 24b is formed in the housing 14 adjacent the wall of the floating piston 18. The second compensation hole 24b is in fluid communication with the conduit 25. The master cylinder 10 further includes a caged spring assembly 30 positioned between the pressure piston 16 and the floating piston 18. The caged spring assembly 30 includes a pin 36 fastened to the face of the pressure piston 16 exposed to the chamber 20. The pin 36 has an enlarged head which retains a cylindrically shaped sleeve 34 slidably on the pin 36. A spring 32 disposed about the pin 36 acts between the piston 16 and a flange on the sleeve 34 to urge the sleeve 34 away from the piston 16 and into engagement with the enlarged head of the pin 36.

A lip seal 39 is cylindrically mounted about the cylindrical wall of the floating piston 18 to seal the chamber 20. An O-ring 54 disposed inside the housing 14 about the right end (as viewed in FIG. 1) of the floating piston 18 seals between the floating piston 18 and the housing 14 to prevent fluid from the second compensation hole 24b entering the pedal simulator 12. The O-ring 54 is a static seal, that is, remains stationary relative to the housing 14 as the floating piston 18 moves relative to the housing 14. The lip seal 39, in contrast, is known a dynamic seal, as the lip seal 39 moves with the floating piston 18 relative to the housing 14.

The pedal simulator 12 includes a conical-wound helical compression spring 40. The ends of the conical spring 40 are retained by first and second retaining plates 42 and 44. The first spring retaining plate 42 is urged by the small diameter end of the spring 40 toward the floating piston 18. A boss 42a formed on the first spring retaining plate 42 is thus urged into a corresponding recess 18a formed in the floating piston 18. This arrangement radially guides the small end of the spring 40, and transmits forces between the floating piston 18 and the spring 40. The second retaining plate 44 is in contact with the large diameter end of the conical spring 40 and is movable with respect to the housing 14 by an adjustment mechanism 46. The adjustment mechanism 46 can be any suitable structure which adjusts the length of the conical spring 40 when the master cylinder 10 is in an unactuated state, as shown in FIG. 1. Thus, the adjustment mechanism acting through the second retaining plate 44 permits the preload of the spring 40 to be adjusted. It is contemplated that the second retaining plate 44 and the adjacent mechanism 46 may be replaced by a fixed support structure if so desired. An adjustable piston stop 48 extends inward from the right-hand end of the master cylinder 10 to adjust the maximum stroke length of the floating piston 18. The piston stop 48 may likewise be replaced with a non-adjustable structure if desired.

When the master cylinder 10 is actuated, the force from the brake pedal moves the pressure piston 16 rightward (apply stroke), as viewed in FIG. 1, so that the lip seal 28 moves past the first compensation hole 24a. The cylindrical pressure spring 32 is provided so that by a defined preload, the pressure piston 16 and the floating piston 18 always start together and generally travel the same distance until the lip seal of the pressure piston 16 has passed the first compensation hole 24. Note that the cylindrical pressure spring 32 of the caged spring assembly 30 may be compressed slightly until the lip seal 28 moves past the first compensation hole 24a. Thereafter, fluid trapped between the pressure piston 16 and floating piston 18 prevents further compression of the spring 32. This is because the housing 14 and the lip seal 28 cooperate to prevent the flow of fluid from the hydraulic chamber 20 to the reservoir port 26 as pressure in the chamber 20 rises as will be described below. During normal actuation of the master cylinder 10, the brake system isolation valve (not shown) is controlled to block the flow of fluid through the outlet port 22. The "locked" fluid within the hydraulic chamber 20 and the movement of the pressure piston 16 causes the floating piston 18 to move rightward, as viewed in FIG. 1, thereby compressing the conical spring 40. The compression of the conical spring 40 produces a reactionary spring force which is transmitted back through the first retaining plate 42, the floating piston 18, the volume of fluid within the hydraulic chamber 20 (where pressure rises as a result), and the pressure piston 16. This reactionary force is felt by driver via the brake pedal. The conical spring 40 produces a non-linear, progressive spring force, the reason for which will be explained below. Note that on the apply stroke of the pressure piston 16, the extension 25a of the conduit 25 allows fluid to flow in the annular area between the wall of the bore 19 and the outer wall of the pressure piston 16.

On the return stroke of the pressure piston 16 (leftward as viewed in FIG. 1), when the lip seal 28 moves leftward of the first compensation hole 24a, fluid is permitted to flow from the reservoir port 26 if additional fluid is needed.

The second compensation hole 24b helps to prevent air from entering the hydraulic chamber 20 by filling the annular area about the floating piston 18 between the lip seal 18 and the O-ring 59 with fluid from the reservoir, and venting pressure and any air which may be introduced into the annular area of the reservoir. Note that on the return stroke of the pressure piston 16, the fluid in the annular area between the wall of the bore 19 and the outer wall of the pressure piston 16, flows into the reservoir via the extension 25a, the conduit 25, and the reservoir port 26.

In the case of a brake system failure, the isolation valve opens the fluid communication between the outlet port 22 and the wheel brakes so that the pressurized brake fluid in the chamber 20 can be directed out of the outlet port 22 to actuate the hydraulic brakes similar to a conventional single circuit master cylinder. Note that a relatively small reservoir can be used with the master cylinder 10 because the changes in the volume of fluid in the hydraulic brake system outside the master cylinder to compensate for brake pad wear is done by a normal (pump operated) electronically controlled source of pressurized brake fluid (not shown) which is in fluid communication with the wheel brakes even when the isolation valve at the outlet port 22 is shut. The brake fluid within the reservoir and the master cylinder are used generally only in event of brake failure.

In case of failure in which there is a fluid leak within the hydraulic chamber 20, such as by a failure of the lip seals 28 or 39, the pressure piston 16 will travel towards the floating piston 18 until the end of the sleeve 34 directly contacts the end of the pressure piston 16. The pressure piston 16 will then directly push the floating piston 18, thereby compressing the conical spring 40.

Ideally a vehicle having brakes which are controlled and applied by electronics, but operated by hydraulic fluid means, will have a "pedal feel" similar to that of a conventional boosted brake system. Representative values of pedal force and pedal travel for a typical conventional boosted brake system are given in the chart of FIG. 5A. The graph of FIG. 5B plots the values of the chart in FIG. 5A to provide a graph of the pedal force versus pedal travel curve of the conventional boosted brake system. Note the pedal force versus pedal travel curve is non-linear and has a progressively increasing slope. It should also be noted that although the computer generated pedal force versus pedal travel curve illustrated in the graph of FIG. 5B is shown as being composed of straight line segments between data points, the actual curve should be understood to be relatively smooth and continuous (i.e., a smoothly increasing curve). The shape of the conical spring 40 produces a non-linear, progressive spring force coefficient to provide a non-linear pedal force versus pedal travel curve similar to the pedal force versus pedal travel curve of the conventional boosted brake system illustrated in FIG. 5B. The size, shape, and material of the conical spring 40 can be altered suitably to obtain a desired pedal force versus pedal travel curve. In particular, the shape of the conical spring 40 can be adjusted to provide a non-uniform helix angle to give a varying spring characteristic as the coils of the conical spring 40 are sequentially collapsed under compression.

Preferably, the pedal simulator 12 is housed within the master cylinder 10 but can be a separate component if so desired. The integration of the pedal simulator 12 and the master cylinder 10 reduces the total volume of components and reduces the friction associated with separate components. Likewise, the isolation valve(s) for the outlet port and/or the separation piston, which separate the master cylinder 10 from the hydraulic brake circuit may be integrated into the master cylinder 10 to improve the packaging and functionality of the pedal simulator.

Figure 2:
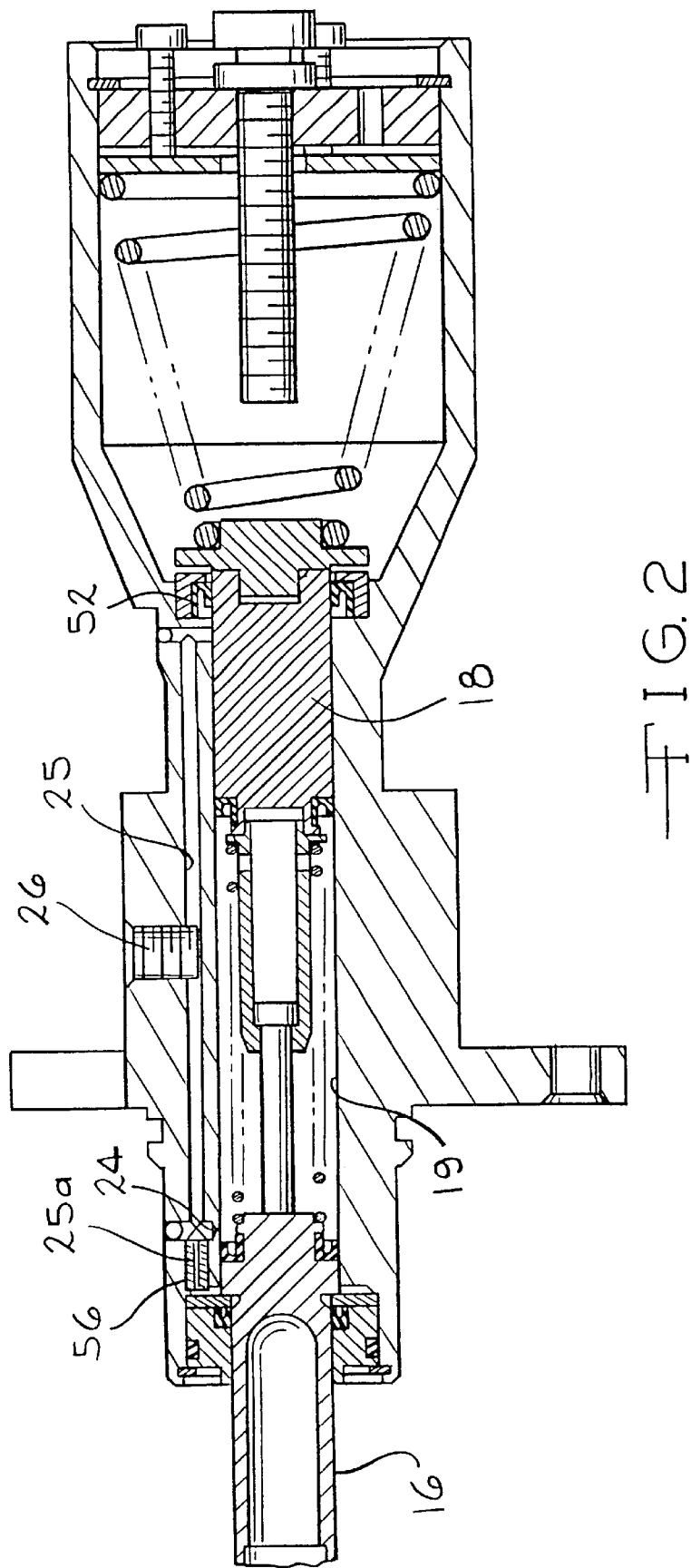
FIG. 2 is a view similar to that of FIG. 1, but showing another embodiment of the invention.

FIG. 2 is an illustration of a second embodiment of a master cylinder, indicated generally at 50, in accordance with the present invention. The master cylinder 50 of FIG. 2 is similar in function and structure to the master cylinder 10 illustrated in FIG. 1. One difference is a lip seal 52 sealingly engaged with the floating piston 18, instead of the O-ring 54 in the master cylinder 10 shown in FIG. 1. The master cylinder 50 has an orifice 56 located within the extension 25a of the conduit 25. The orifice 56 is of lesser diameter than the conduit 25a to provide fluid flow damping during the return stroke of the pressure piston 16, the floating piston 18, and the brake pedal when fluid flows from the annular area between the wall of the bore 19 and the outer wall of the pressure piston 16 and into the reservoir via the extension 25a, the conduit 25, and the reservoir port 26. A softer pedal feel characteristic results from such fluid flow damping.

Figure 3:
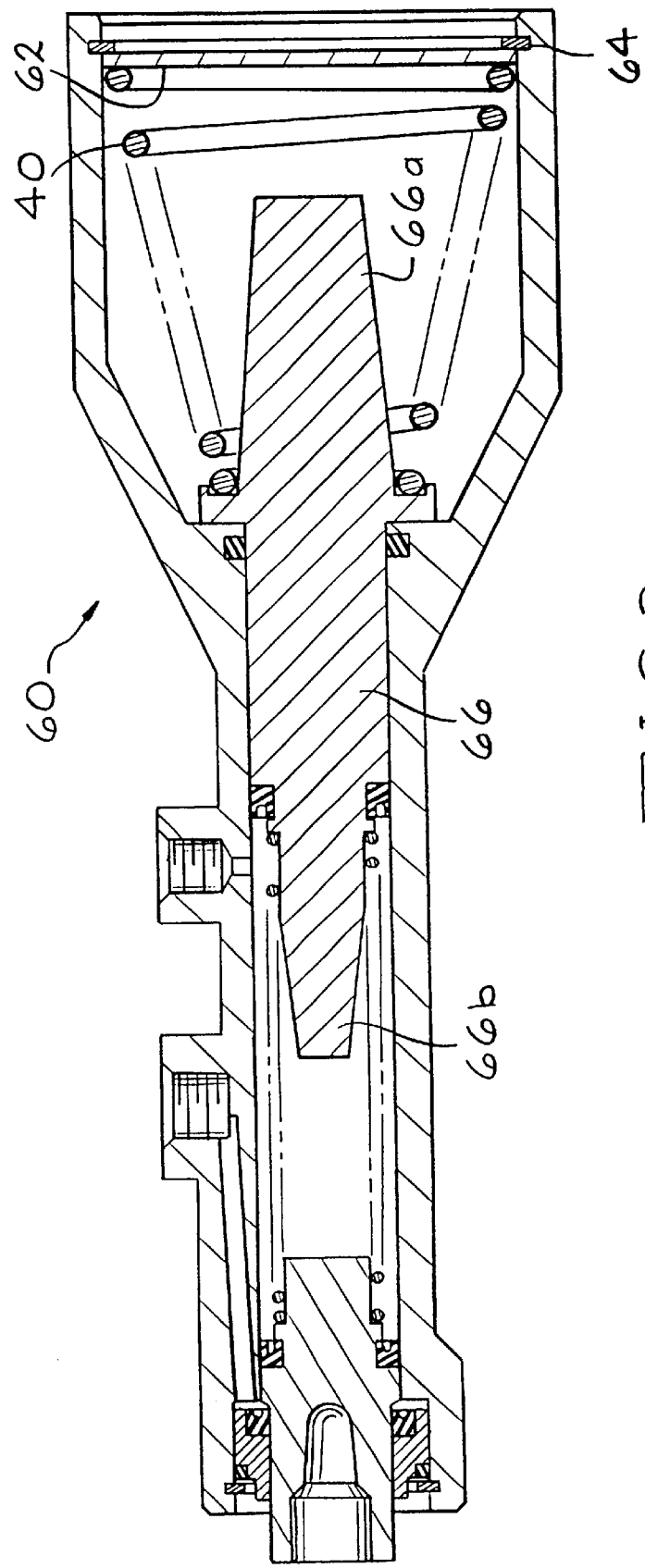
FIG. 3 is a view similar to that of FIGS. 1 and 2, but showing another embodiment of the invention.

FIG. 3 is an illustration of a third embodiment of a master cylinder 60 which incorporating the conical spring 40. The master cylinder 60 is similar in function and structure compared to the master cylinders 10 and 50. Note that no adjustment mechanism 46 or spring retaining plates 42 or 44 are used. Instead, the conical spring 40 bears against an end plate 62 which is butted against a circlip 64 engaging the housing 40 of the master cylinder 60. The smaller diameter end of the conical spring 40 bears against an elongated floating piston 66. A piston stop 66a formed on the floating piston 66 engages the end plate 62 to limit movement of the floating piston 66, thus performing the function of the piston stop 48 illustrated in FIG. 1. The floating piston 66 has a second extension 66b formed on the left end (as viewed in FIG. 3) thereof. The extension 66b is adapted to engage the pressure piston of the master cylinder 60 in the event of failure preventing a hydraulic fluid lock between the pressure piston of the master cylinder 60 and the floating piston 66 and thus is similar in function to the sleeve 34 of the master cylinder 10.

Figure 4:
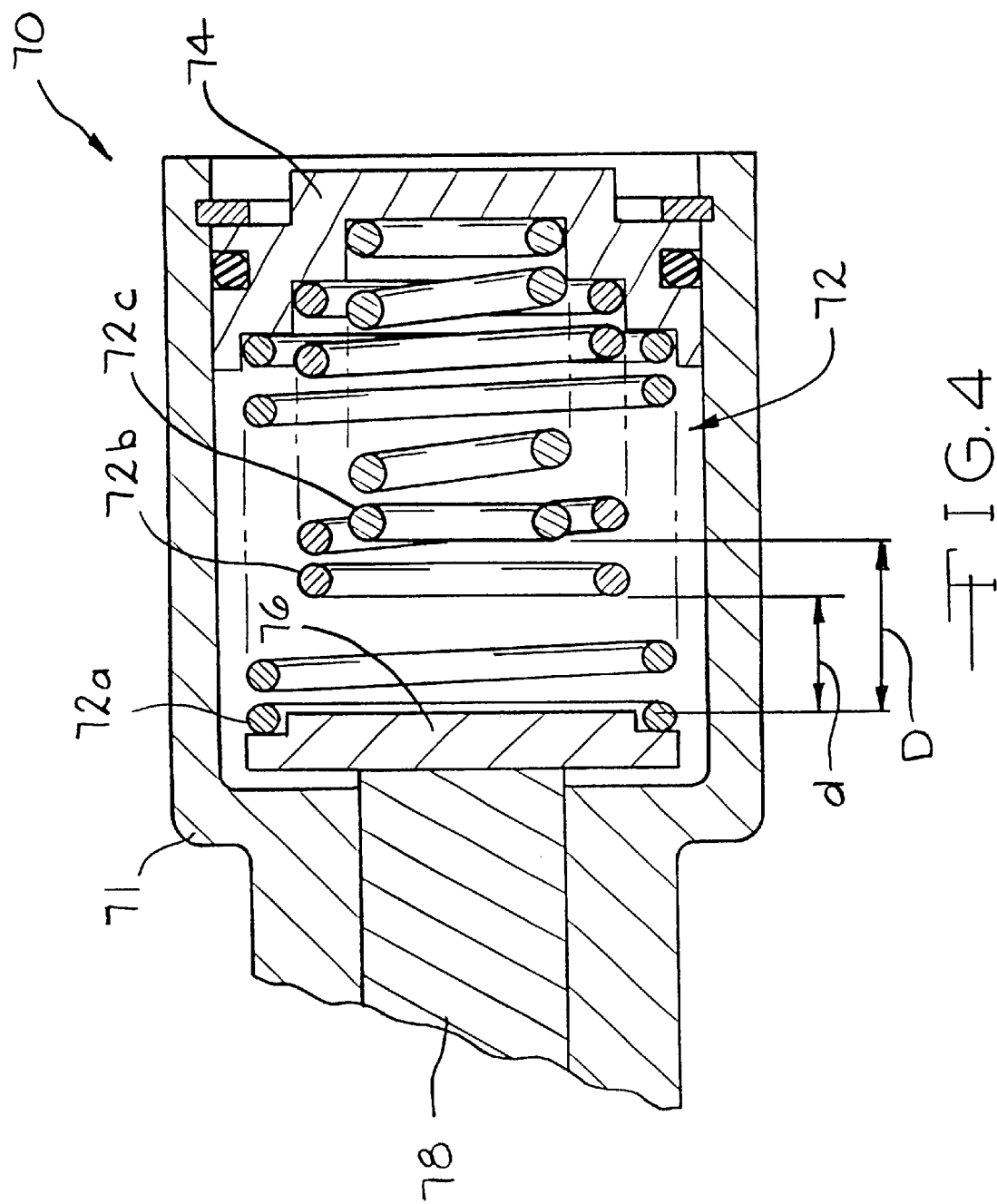
FIG. 4 is a sectional view of an alternate embodiment of the pedal simulator of the invention having a plurality of parallel acting springs.

FIG. 4 is an illustration of an alternate embodiment of a pedal simulator 70 having a housing 71. The pedal simulator 70 and housing 71 can be integrated into a master cylinder or can be a separate component with the floating piston in hydraulic communication with the master cylinder. The pedal simulator 70 is similar in function to the pedal simulator 12 of FIGS. 1 through 3 but includes a spring assembly 72 which provide for the non-linear, progressive spring force coefficient. The spring assembly 72 includes three springs 72a, 72b, and 72c, each having a different spring rate and spring length. Although the master cylinder 70 as illustrated in FIG. 4 shows three springs, it should be understood that any multiple number of springs can be used. As shown in FIG. 4, the righthand ends of the springs 72a, 72b, and 72c are in contact with and are retained by an annular retainer 74 which is fixed with respect to the housing 71.

When the pedal simulator 70 and associated master cylinder are in the non-actuated position, as shown in FIG. 4, the spring 72a is slightly compressed between the retainer 74 and a plate 76 which is engaged by a floating piston 78 of the master cylinder. As the master cylinder is actuated, the floating piston 78 moves rightward and compresses the spring 72a further. When the plate 76 has moved a distance "d", the plate 76 contacts the end of the spring 72b. Further movement of the plate 76 compresses the spring 72b as well as the spring 72a. When the plate 76 has moved a distance "D", the plate 76 contacts the end of the spring 72c. Further movement of the plate 76 compresses the spring 72c as well as the springs 72a and 72b. This compression of the spring assembly 72 produces a combined non-linear, progressive spring force coefficient.

Figure 6A:
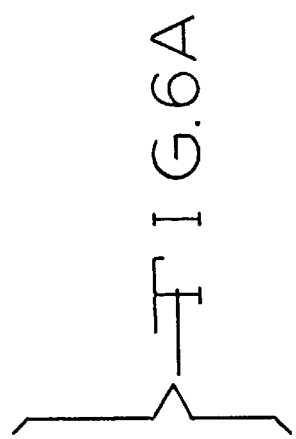
FIG. 6A is a chart of the pedal simulator stroke versus pedal simulator input force required to achieve the conventional pedal response of FIGS. 5A and 5B.
Figure 6B:
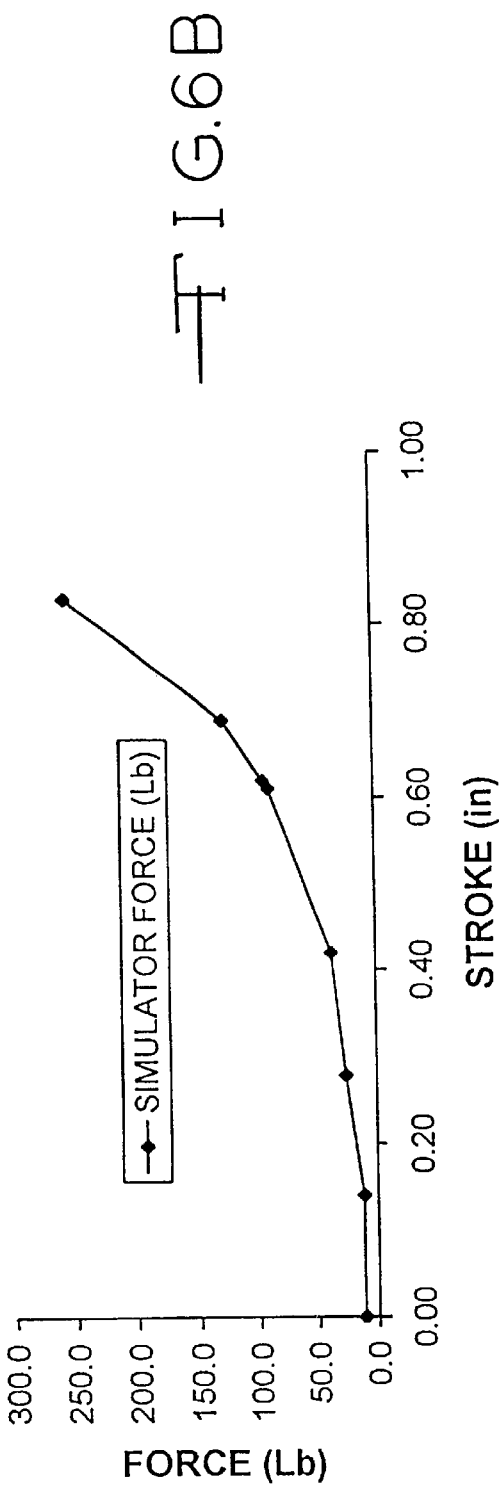
FIG. 6B is a graph of an ideal pedal simulator stroke versus pedal simulator input force required to achieve the conventional pedal response of FIGS. 5A and 5B.
Figures 7C, 7D:
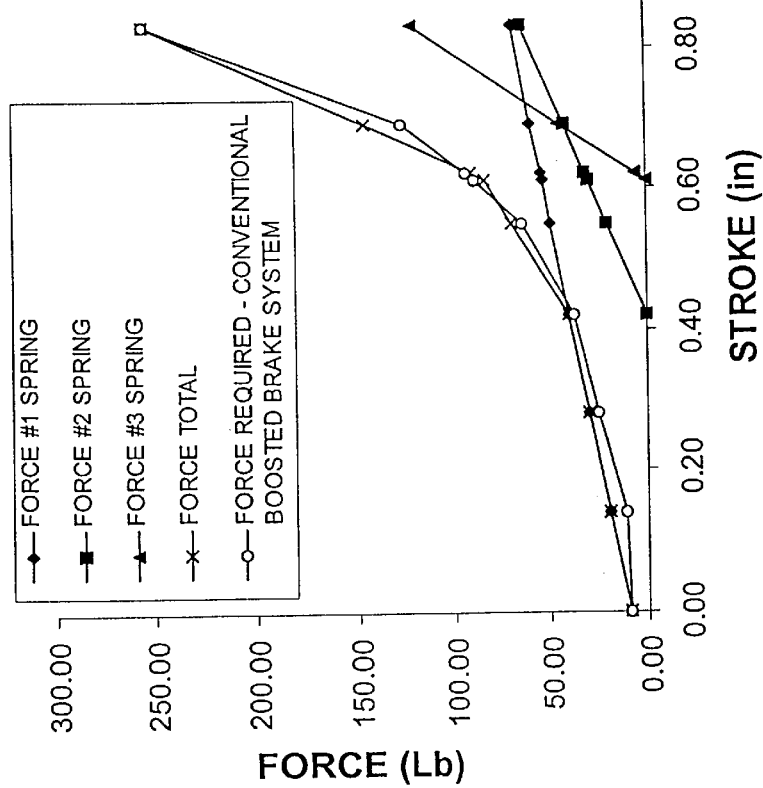
FIG. 7C is a chart of predicted pedal simulator stroke versus individual and total spring loadings for the springs in the chart of FIG. 7A .
FIG. 7D is a graph showing the predicted pedal simulator stroke versus total pedal input force and the ideal pedal simulator stroke versus pedal simulator input force required to achieve the conventional pedal response of FIGS. 5A and 5B.

From the curve of the conventional brake system pedal travel versus pedal force curve illustrated in FIG. 5B, it is possible to calculate a simulator stroke versus pedal simulator input force curve based on the system pedal ratio (which is the ratio of pedal travel to simulator stroke). FIG. 6A is a chart of an ideal pedal simulator stroke versus pedal simulator input force required to achieve the conventional pedal response of FIGS. 5A and 5B based on a pedal ratio of 2.84:1. This information is presented graphically in FIG. 6B FIG. 7A is a chart of spring characteristics for one suitable set of springs which may be used in the pedal simulator of FIG. 4. As presented in FIGS. 7A through 7D, "Spring#1" and "#1" Spring refer to the longest spring 72a, "Spring#2" and "#2 Spring" refer to the spring 72b, and "Spring#3" "#3 Spring" refer to the shortest spring 72c.

FIG. 7B is a chart of predicted pedal simulator stroke versus individual spring deflection and loading for the springs 72a, 72b, and 72c, while FIG. 7C is a chart of predicted pedal simulator stroke versus individual and total spring loadings for the springs 72a, 72b, and 72c.

Figure 5A:
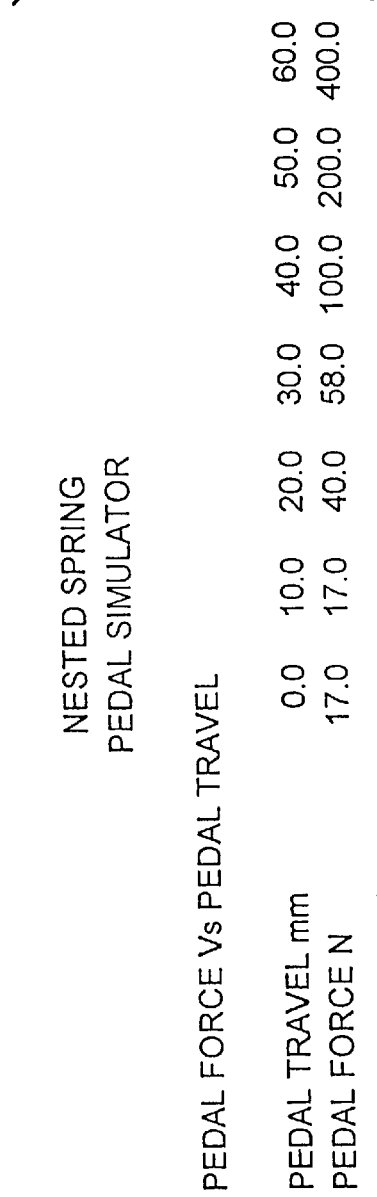
FIG. 5A is a chart of pedal force versus pedal travel for a typical conventional boosted brake system.
Figure 5B:
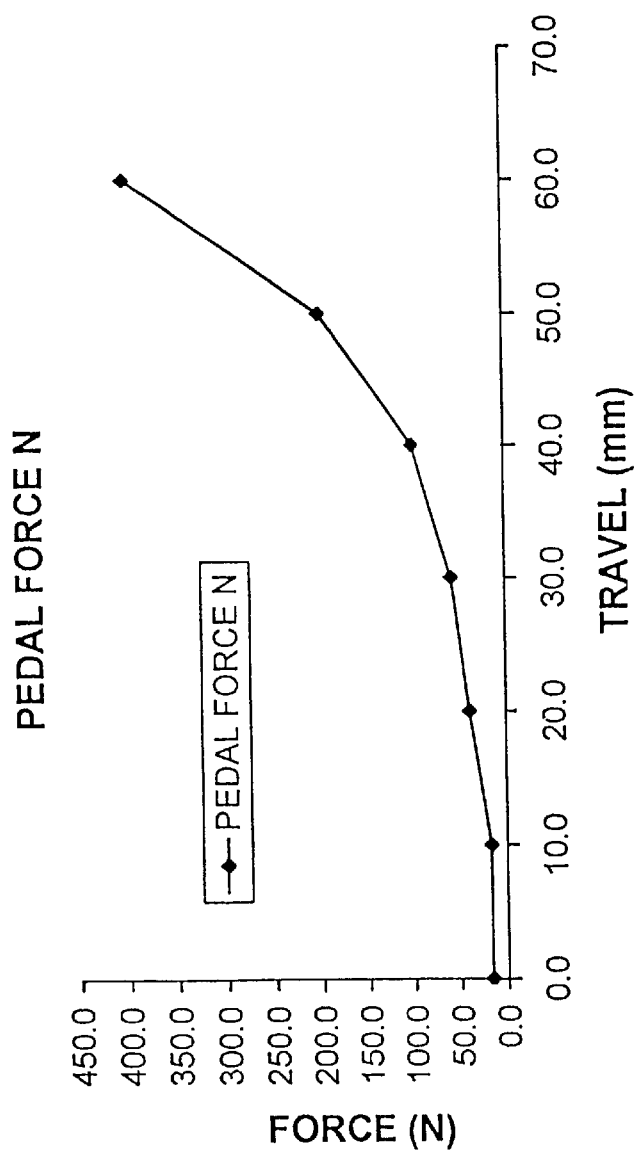
FIG. 5B is a graph of pedal force versus pedal travel for a typical conventional boosted brake system.

FIG. 7D is a graph showing the predicted pedal simulator stroke versus total pedal input force and the ideal pedal simulator stroke versus pedal simulator input force required to achieve the conventional pedal response of FIGS. 5A and 5B.

FIG. 7D is a plot of the spring force vs. stroke for the combined nested springs 72a, 72b, and 72c. The graph of FIG. 7D shows how the curves of the spring force vs. stroke length of the individual springs 72a, 72b, and 72c (shown at 79a, 79b, and 79c, respectively) are added to achieve a combined total spring curve, 79d. The ideal spring force vs. stroke curve, 79e, is the ideal pedal simulator stroke versus pedal simulator input force curve from FIG. 6B. As will be appreciated from a comparison of the curves 79d and 79e, the pedal simulator 70 gives a pedal feel which closely matches the pedal feel of a conventional boosted brake system.

Figure 8:
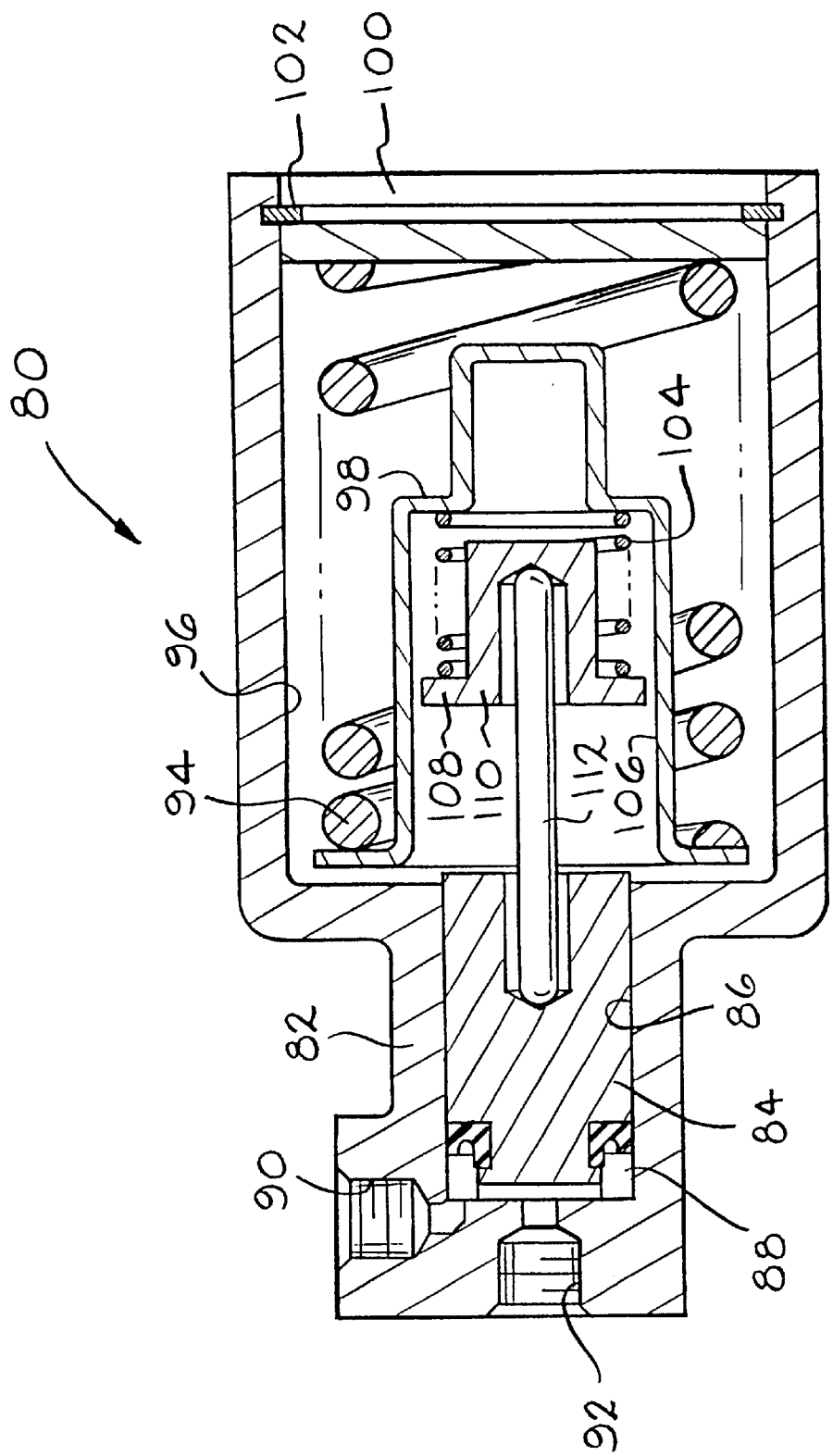
FIG. 8 is a view similar to FIG. 4, but showing an alternate embodiment having a plurality of series acting springs.

FIG. 8 is an illustration of another alternate embodiment of a pedal simulator 80 having a housing 82. The pedal simulator 80 is shown as a separate component and is not integrated into a master cylinder (not shown). However, it is contemplated that the pedal simulator 80 could be integrated into a master cylinder in a manner similar to the master cylinder 10 and the pedal simulator 12 of FIG. 1. The pedal simulator 80 includes a piston 84 slidably disposed within a bore 86 formed in the housing 82. The piston 84 and a closed end of the bore 86 define a chamber 88. The chamber 88 is in fluid communication with an outlet port (not shown) of the master cylinder via a first port 90 formed through the housing 82. The chamber 88 is also in fluid communication with an isolation valve (not shown) via a second port 92 formed through the housing 82, which isolation valve selectively isolates the master cylinder (and the pedal simulator 80) from the hydraulic wheel brakes of the vehicle. Note that the chamber 88 and the first and second ports 90 and 92 provide continuous fluid communication between the outlet port of the master cylinder and the isolation valve.

The pedal simulator 80 further includes a relatively large coil first spring 94 disposed within a bore 96 formed in the housing 82. The bore 96 is larger in diameter than the bore 86 with a radial stop defined between the bore 86 as the bore 96. The first spring 94 is retained between an annular retainer 98 and an end plate 100. The end plate 100 abuts a snap ring 102 engaging the housing 82 near the right-hand end (as viewed in FIG. 8) of the base 96. A second spring 104 is disposed within a cylindrical cavity 106 formed in the retainer 98. The first spring 94 has a higher spring rate than the second spring 104 (the first spring 94 requires more force to compress the spring a given distance than the second spring 104). The second spring 104 is positioned between the retainer 98 and a radially extending flange 108 of an annular cap 110. The cap 110 is positioned at a fixed distance from the piston 84 by a rod 112. The first and second springs 94 and 104 are, thus, arranged in a series arrangement.

When the master cylinder in fluid communication with the pedal simulator 80 is actuated, pressurized fluid enters the chamber 88 through the first port 90, causing the piston 84, the rod 112, the cap 110, the spring 108, and the retainer 98 to move rightward, as viewed in FIG. 8. This movement compresses the first and second springs 94 and 104 at a combined series spring rate. Since the second spring 104 has a lower spring rate than the first spring 94, the second spring 104 will decrease in length at a higher rate than the first spring 94 and the combined series spring rate will preferably be very close to the spring rate of the second 104. Of course, the exact combined spring rate depends on the relative magnitudes of the spring rates of the first and second springs 94 and 104. The coils of the second spring 104 will eventually bottom out as the piston 84 continues to move. Further movement of the piston 84 will compress only the first spring 94, thereby changing the spring rate of the pedal simulator 80 to the spring rate of the first spring 94. In other words, as the coils on the second spring 104 bottom out, the spring rate of the pedal simulator approaches the spring rate of the second spring 104. This transition will generally be smooth since the loading on each of the springs 94 and 104 is the same.

Figure 9:
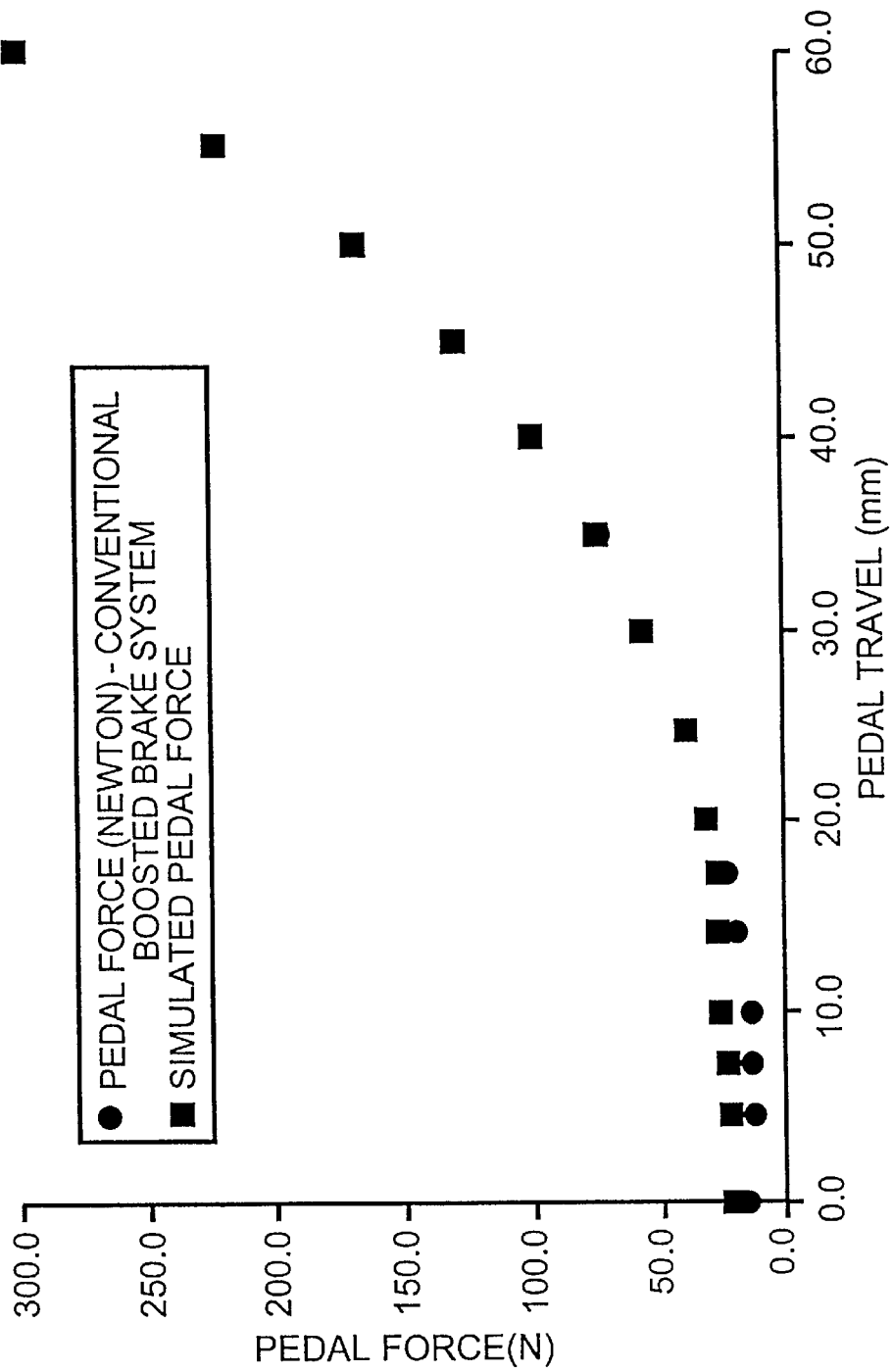
FIG. 9 is a graph of an ideal pedal force versus pedal travel response characteristic compared to a predicted pedal force versus pedal travel response characteristic for the springs of FIG. 8.

FIG. 9 is a graph of the pedal force vs. pedal travel length for the spring arrangement of the pedal simulator 80 as illustrated in FIG. 8. The plot labeled "Pedal Force (Newton)" is an exemplary pedal travel versus pedal force curve of a typical conventional boosted brake system. The plot labeled "Simltd Pedal" is a predicted pedal travel versus pedal force curve produced by the spring arrangement of the pedal simulator 80. As will be appreciated by comparing the curves of FIG. 9, it is expected that the pedal simulator 80 can produce a pedal feel substantially similar to that of a conventional boosted brake system.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A pedal simulator comprising:

a housing having a bore therein;

a piston disposed within said bore; and a spring mechanism operatively connected to said piston such that movement of said piston in a direction towards said spring mechanism compresses said spring mechanism, said spring mechanism having a non-linear spring force coefficient, said spring mechanism including first and second springs operatively connected in a series arrangement, said first spring having a spring rate which is higher than the spring rate of said second spring.

2. The pedal simulator of claim 1, further including a pressure piston disposed in said bore, said piston, said pressure piston, and said housing cooperating to define a chamber of a master cylinder within said bore.

3. A pedal simulator comprising:

a housing having a bore therein;

a piston disposed within said bore;

a spring mechanism operatively connected to said piston such that movement of said piston in a direction towards said spring mechanism compresses said spring mechanism, said spring mechanism having a non-linear spring force coefficient;

a pressure piston disposed in said bore, said piston, said pressure piston, and said housing cooperating to define a chamber of a master cylinder within said bore; and a static seal sealing between said housing and an axially central portion of said piston, and a dynamic seal sealing between said piston and said housing, said dynamic seal forming part of a pressure boundary for said chamber of said master cylinder.

4. The pedal simulator of claim 3, wherein said spring mechanism includes a plurality of parallel nested coil springs.

5. A pedal simulator comprising:

a housing having a bore therein;

a piston disposed within said bore; and a spring mechanism operatively connected to said piston such that movement of said piston in a direction towards said spring mechanism compresses said spring mechanism, said spring mechanism having a non-linear spring force coefficient, said spring mechanism including a spring subjectable to a preload and further including an adjustment mechanism operably connected to said spring, said adjustment mechanism adapted to adjust said preload of said spring.

6. The pedal simulator of claim 5, wherein said adjustment mechanism includes a retaining plate upon which an end of said spring is seated, said retaining plate being movable within said housing to adjust the preload of said spring.

7. The pedal simulator of claim 6, wherein said adjustment mechanism includes a threaded member operably connected to said retaining plate, said threaded member being rotatable to move said retaining plate within said housing to adjust the preload of said spring.

8. A pedal simulator comprising:

a housing having a bore therein;

a piston disposed within said bore;

a spring mechanism operatively connected to said piston such that movement of said piston in a direction towards said spring mechanism compresses said spring mechanism, said spring mechanism having a non-linear spring force coefficient; and a piston stop operably engaging said housing, said piston stop disposed to engage said piston to set a position of maximum movement of said piston in the direction toward said spring mechanism, said piston stop being selectively movable relative to said housing to vary said position of maximum movement of said piston in the direction toward said mechanism.

9. A pedal simulator comprising:

a housing having a bore therein;

a piston disposed within said bore;

a first spring retaining plate engaging said piston;

a second spring retaining plate engaging said housing; and a spring disposed between said first spring retaining plate and said second spring retaining plate such that movement of said piston in a direction towards said spring compresses said spring, said spring having a non-linear spring force coefficient.

* * * * *

UNITED STATES PATENT AND TRADEMARK OFFICE
CERTIFICATE OF CORRECTION

PATENT NO.    : 6,347,518 B1                                        Page 1 of 1
DATED         : February 19, 2002
INVENTOR(S)   : Andrew W. Kingston et al.

It is certified that error appears in the above-identified patent and that said Letters Patent is hereby corrected as shown below:

<u>Column 9,</u>
Line 30, delete "wherein said spring mechanism includes a plurality of parallel nested coil springs" and insert -- further including a fluid reservoir, said fluid reservoir communicating, via a first passage defined in said housing, with the annular area of said bore about said piston between said static seal and said dynamic seal --.

Signed and Sealed this

Thirteenth Day of August, 2002

*Attest:*

*Attesting Officer*

JAMES E. ROGAN
*Director of the United States Patent and Trademark Office*